US009067283B2

(12) United States Patent
Sato

(10) Patent No.: US 9,067,283 B2
(45) Date of Patent: Jun. 30, 2015

(54) MACHINING METHOD

(75) Inventor: Yoshikatsu Sato, Minato-ku (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 305 days.

(21) Appl. No.: 13/819,799

(22) PCT Filed: Jul. 25, 2011

(86) PCT No.: PCT/JP2011/066802
§ 371 (c)(1),
(2), (4) Date: Apr. 15, 2013

(87) PCT Pub. No.: WO2012/035883
PCT Pub. Date: Mar. 22, 2012

(65) Prior Publication Data
US 2013/0192054 A1 Aug. 1, 2013

(30) Foreign Application Priority Data
Sep. 17, 2010 (JP) ................. 2010-208707

(51) Int. Cl.
B23P 13/00 (2006.01)
B23Q 11/00 (2006.01)
(Continued)

(52) U.S. Cl.
CPC ............. *B23P 13/00* (2013.01); *Y10T 29/49* (2015.01); *B23Q 17/2233* (2013.01);
(Continued)

(58) Field of Classification Search
CPC ........ B23P 13/00; B23Q 17/02; B23Q 17/22; B23Q 17/2233; B23Q 17/224; B23Q 17/2461; B23Q 11/14; B23Q 15/02; B23Q 15/04; B23Q 15/06; B23Q 15/22; B23Q 15/24; B23B 49/00; B23B 2270/48; B23B 2270/10; G01B 21/045; G05B 19/401; G05B 19/4015; G05B 19/402; G05B 2219/37406; G05B 2219/37407; G05B 2219/37408; Y10T 408/175; Y10T 408/303752; Y10T 409/303864; Y10T 409/30728; Y10T 409/307336; Y10T 409/303808; Y10T 409/306888; Y10T 409/306944; Y10T 409/308064

See application file for complete search history.

(56) References Cited

U.S. PATENT DOCUMENTS 7,120,288 B2 * 10/2006 Fujishima ..................... 382/152
8,494,800 B2 * 7/2013 Matsushita ..................... 702/95

FOREIGN PATENT DOCUMENTS

JP 63-68342 3/1988
JP 63068342 A * 3/1988 ............. B23Q 17/22
(Continued)

OTHER PUBLICATIONS

English Machine Translation of KR 100161339 B1.*
(Continued)

*Primary Examiner* — Sarang Afzali
(74) *Attorney, Agent, or Firm* — Wenderoth, Lind & Ponack, L.L.P.

(57) ABSTRACT

A touch probe is attached to a main shaft, and the position (Pp1) of a tip with the probe in an on state and the position (Pp2) of the tip with the probe in an off state, when the end of the main shaft is positioned at a prescribed position (Ps1), are optically measured. The dead zone length of the probe is calculated based on the positions (Pp1, Pp2), and the apparent length of the probe is calculated based on the positions (Ps1, Pp2). After the substantive length of the probe has been calculated by adding the dead zone length to the apparent length, the probe derives the actual length of a workpiece, and a tool is then attached to the main shaft, the position (Pt1) of the tip of the tool is optically measured and the actual length of the tool is calculated.

1 Claim, 6 Drawing Sheets

(51) Int. Cl.
  *B23Q 17/20* (2006.01)
  *B23C 3/00* (2006.01)
  *B23Q 17/24* (2006.01)
  *G01B 21/04* (2006.01)
  *B23Q 17/22* (2006.01)

(52) U.S. Cl.
  CPC ... *Y10T 408/175* (2015.01); *Y10T 409/303752* (2015.01); *Y10T 409/303864* (2015.01); *Y10T 409/30728* (2015.01); *Y10T 409/307336* (2015.01); *B23Q 17/22* (2013.01); *B23Q 17/2461* (2013.01); *G01B 21/045* (2013.01)

(56) References Cited

FOREIGN PATENT DOCUMENTS

| | | | | |
|---|---|---|---|---|
| JP | 03277450 A | * | 12/1991 | ............ B23Q 17/22 |
| JP | 2001-105279 | | 4/2001 | |
| JP | 2001105279 A | * | 4/2001 | ............ B23Q 15/06 |
| JP | 2006-289608 | | 10/2006 | |
| JP | 2010052053 A | * | 3/2010 | ............ B23Q 17/22 |
| KR | 100161339 | | 1/1999 | |

OTHER PUBLICATIONS

Korean Notice of Allowance issued Sep. 15, 2014 in corresponding Korean Patent Application No. 10-2013-7006704 with English translation.

International Search Report issued Oct. 4, 2011 in International (PCT) Application No. PCT/JP2011/066802.

International Preliminary Report on Patentability and Written Opinion of the International Searching Authority issued Apr. 25, 2013 in International (PCT) Application No. PCT/JP2011/066802.

* cited by examiner

MACHINING METHOD

TECHNICAL FIELD

The present invention relates to a machining method using a machine tool, such as a machining center, configured to machine a workpiece by moving a tool attachably and detachably attached to a main spindle and the workpiece fixed and supported on a table relative to each other.

BACKGROUND ART

To machine a workpiece with high precision, a machine tool, such as a machining center, for machining a workpiece by moving a tool attachably and detachably attached to a main spindle and the workpiece fixed and supported on a table relative to each other is configured to, first, measure and find each of the actual length of the tool attached to the main spindle and the actual height position the length in the vertical direction) of the workpiece on the table, and then machine the workpiece on the basis of the length of the tool and the height position (the length in the vertical direction) of the workpiece.

Conventionally, the length of a tool and the height position (the length in the vertical direction) of a workpiece are found by any of the following procedures.

(1) An indicator is attached to a main spindle, and the height position (the length in the vertical direction) of a workpiece is found from the difference between the position of an end of the main spindle at the time when the indicator is in contact with the upper surface of a table, and the position of the end of the main spindle at the time when the indicator is in contact with the upper surface of the workpiece. Meanwhile, tool is attached to the main spindle, and the length of the tool is found by subtracting the height of contact type (or laser type) tool measuring device mounted on the table from the position of the end of the main spindle at the time when the tool is brought into contact with a detection unit (or caused to block a laser beam) of the tool measuring device and is detected by the detection unit of the tool measuring device.

(2) A touch probe attached to a main spindle, and the height position (the length in the vertical direction) of a workpiece is found by subtracting the length of the touch probe from the position of an end of the main spindle at the time when the touch probe is brought into contact with an upper surface of the workpiece and the touch probe detects the workpiece. Meanwhile, a tool is attached to the main spindle, and the length of the tool is found in the same manner as that in the above-described (1).

(3) A touch probe is attached to a main spindle, and the actual length of the touch probe is calculated by subtracting the height of a reference block from the position of an end of the main spindle at the time when the touch probe is brought into contact with an upper surface of the reference block mounted on a table and the touch probe detects the reference block. Then, the height position (the length in the vertical direction) of a workpiece is found by subtracting the actual length of the touch probe from the position of the end of the main spindle at the time when the touch probe is brought into contact with an upper surface of the workpiece and the touch probe detects the workpiece. Meanwhile, a tool is attached to the main spindle, and the length of the tool is found in the same manner as that in the above-described (1).

CITATION LIST

Patent Literature

Patent Literature 1: Japanese Patent Application Publication No. 2006-289608

SUMMARY OF INVENTION

Technical Problem

Here when the length of a tool and the height position (the length in the vertical direction) of a workpiece are found as described above, machining with high precision is difficult to perform because the following factors are also involved when the temperature of the surrounding environment changes: change in length of the tool measuring device with temperature in the above-described (1); changes in lengths of the tool measuring device and the touch probe with temperature in the above-described (2); and changes in lengths of the tool measuring device and the reference block with temperature in the above-described (3).

In this respect, for example, the following is conceivable. (4) A touch probe is attached to a main spindle, and the actual length of the touch probe is calculated by subtracting the height of a contact type (or laser type) tool measuring device mounted on a table from the position of an end of the main spindle at the time when the touch probe is brought into contact with a detection unit (or caused to block a laser beam) of the tool measuring device and the detection unit of the tool measuring device detects the touch probe. Then, the height position (the length in the vertical direction) of a workpiece is found by subtracting the actual length of the touch probe from the position of the end of the main spindle at the time when the touch probe is brought into contact with an upper surface of the workpiece and the touch probe detects the workpiece. Meanwhile, a tool is attached to the main spindle, and the length of the tool is found in the same manner as that in the above-described (1). In other words, it is conceivable that both the tool and the touch probe are measured with the single measuring device on the table, so that the change in length of the measuring device with temperature is canceled.

However, when the actual length of the touch probe is found by using a contact type (or laser type) tool measuring device as in the case of the above-described (4), machining with high precision is difficult to perform because a dead zone length (change in length during a period from the contact to the turning-on) of the touch probe is added.

In view of the above, an object of the present invention is to provide a machining method which enables machining with higher precision than conventional methods.

Solution to Problem

To solve the problem, a machining method according to the present invention provides a machining method using a machine tool configured to machine a workpiece by moving a tool attachably and detachably attached to a main spindle and the workpiece fixed and supported on a table relative to each other, which is characterized by comprising: a touch probe dead zone length calculation step of attaching a touch probe to the main spindle, optically measuring each of a position Pp1 of a tip portion of the touch probe in an on state and a position Pp2 of the tip portion of the touch probe in an off state at the time when a spindle end of the main spindle is located at a prescribed position Ps1, and calculating a dead zone length Lp2 of the touch probe on the basis of the positions Pp1, Pp2; a touch probe length calculation step of calculating an apparent length Lp1 of the touch probe on the basis of the position Ps1 of the spindle end of the main spindle and the position Pp2 of the tip portion of the touch probe in the off state, and calculating a substantive length Lp3 of the touch probe on the basis of the length Lp1 with the dead zone length Lp2 taken into consideration; a workpiece height calculation step of finding an actual height Lw of the workpiece on the basis of the substantive length Lp3 of the touch probe and a position Ps2 of the spindle end of the main spindle at the time when the tip portion of the touch probe attached to the main spindle is brought into contact with an upper surface of the workpiece on the table to cause the touch probe to take an on state; a tool length calculation step of attaching the tool to the main spindle, optically measuring a position Pt1 of a tip portion of the tool at the time when the spindle end of the main spindle is located at a prescribed position Ps3, and calculating an actual length Lt of the tool on the basis of the position Ps3 of the spindle end of the main spindle and the position Pt1 of the tip portion of the tool; and a main machining step of machining the workpiece by moving the workpiece and the tool relative to each other on the basis of the height Lw of the workpiece calculated in the workpiece height calculation step and the length Lt of the tool calculated in the tool length calculation step.

Advantageous Effects of Invention

In the machining method according to the present invention, the dead zone length Lp2 of the touch probe is calculated by optically measuring the position Pp1 of the tip portion of the touch probe in the on state and the position Pp2 of the tip portion in the off state, and the substantive length Lp3 is found from the apparent length Lp1 of the touch probe. In addition, the length Lt of the tool is found by optically measuring the position Pt1 of the tip portion of the tool. Hence, the machining method makes it possible to eliminate measurement errors associated with changes in temperature, and also eliminate measurement errors due to the dead zone length Lp2 of the touch probe. Therefore, it is possible to easily machine a workpiece with higher precision as compared to conventional methods.

DESCRIPTION OF EMBODIMENTS

Embodiments of a machining method according to the present invention are described below on the basis of the drawings. However, the present invention is not limited exclusively to the following embodiments described on the basis of the drawings.
<Main Embodiment>

A main embodiment of the machining method according to the present invention is described on the basis of FIGS. 1 to 6.

Figure 1:
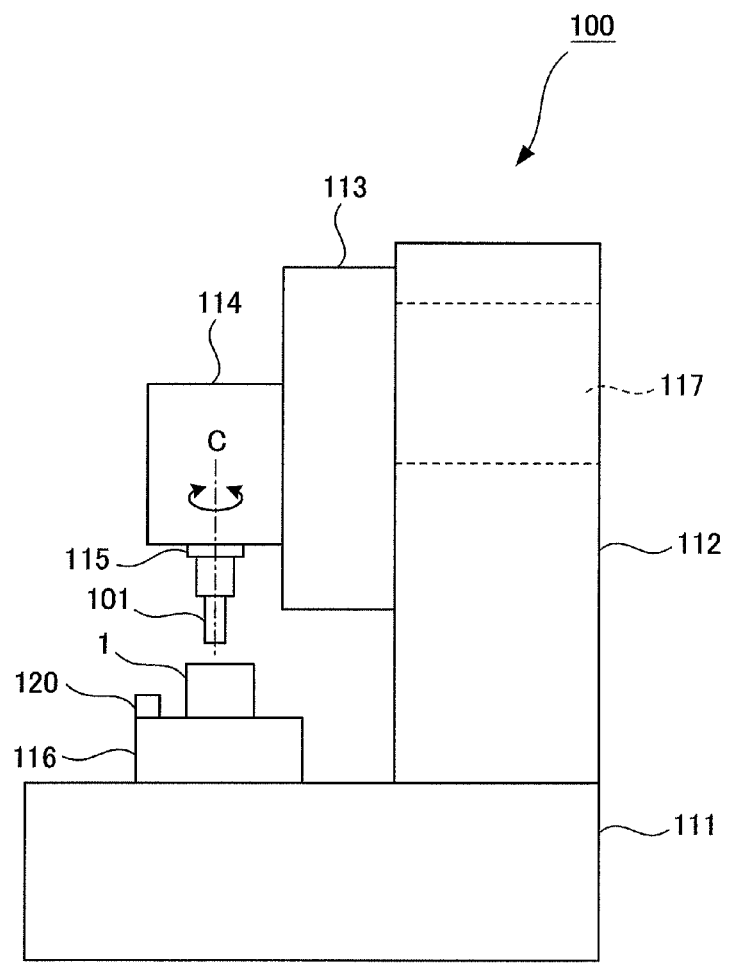
FIG. 1 is a schematic structural view of a main embodiment of a machine tool in which a machining method according to the present invention is used.
Figure 1:
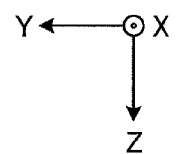

As in FIG. 1, a machine tool 100 according to this embodiment has a column 112 standing on a bed 111 on one side thereof (on the right side in FIG. 1) in a Y-axis direction. A saddle 113 is supported on front surface of the column 112 in a movable manner in an X-axis direction (a direction perpendicular to the sheet surface in FIG. 1). A main spindle head 114 is supported on a front surface of the saddle 113 in a movable manner in a Z-axis direction (a vertical direction in FIG. 1). The main spindle head 114 is provided with a main spindle 115 rotatable around a C-axis (around the vertical axis in the vertical direction in FIG. 1).

A spindle end of the main spindle 115 is configured to allow attachable and detachable fitting of an attachment 101 such as a tool or a touch probe. An automatic tool changer 117 is provided on a side portion of the column 112, and is capable of taking a target attachment 101 out of many attachments 101 stored in a magazine, detaching an attachment 101 attached to the spindle end of the main spindle 115, attaching the above-mentioned attachment 101 to the spindle end of the main spindle 115 instead, and storing the detached attachment 101 into the magazine, in an automatic manner.

A table 116 configured to fix and support a workpiece 1 is provided on the bed 111 on the other side thereof in the Y-axis direction (on the left side in FIG. 1) in a movable manner in the Y-axis direction (the left-right direction in FIG. 1). An attachment measuring device 120 is mounted on the table 116 at such a position that the attachment measuring device 120 does not interfere with the machining of the workpiece 1. The attachment measuring device 120 is attachment measurement means for optically measuring a position in a height direction (the Z-axis direction) of a tip portion of the attachment 101 attached to the spindle end of the main spindle 115.

Figure 2:
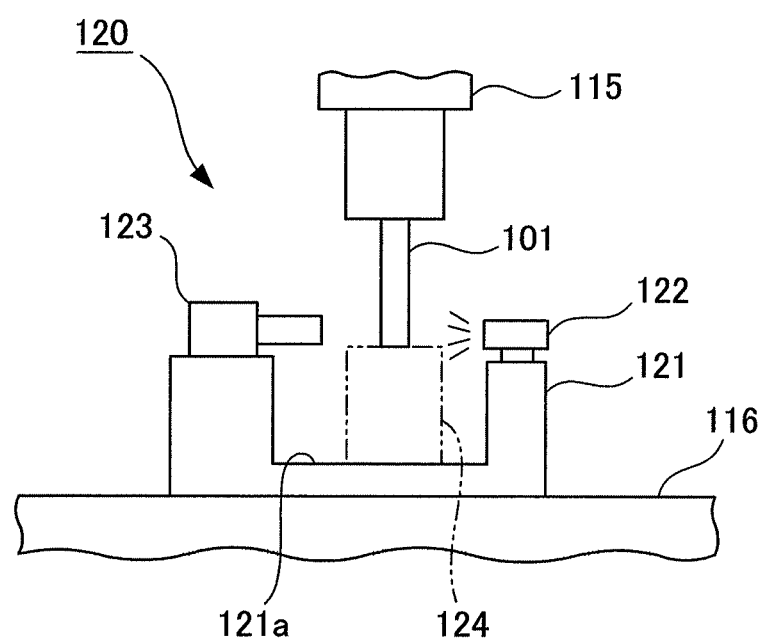
FIG. 2 is a schematic structural view of a main portion of the machine tool of FIG. 1.

As shown in FIG. 2, the attachment measuring device 120 includes a supporting block 121, a light source 122, and a CCD camera 123. The supporting block 121 is provided on the table 116 and has a U shape with a recessed portion 121a. The light source 122 is supported on one upper end portion of the supporting block 121. The CCD camera 123 is image pickup means supported on the supporting block 121 on another upper end portion thereof, while facing the light source 122. Note that reference sign 124 denotes a holding block 124 which can be placed in the recessed portion 121a of the supporting block 121.

Figure 3:
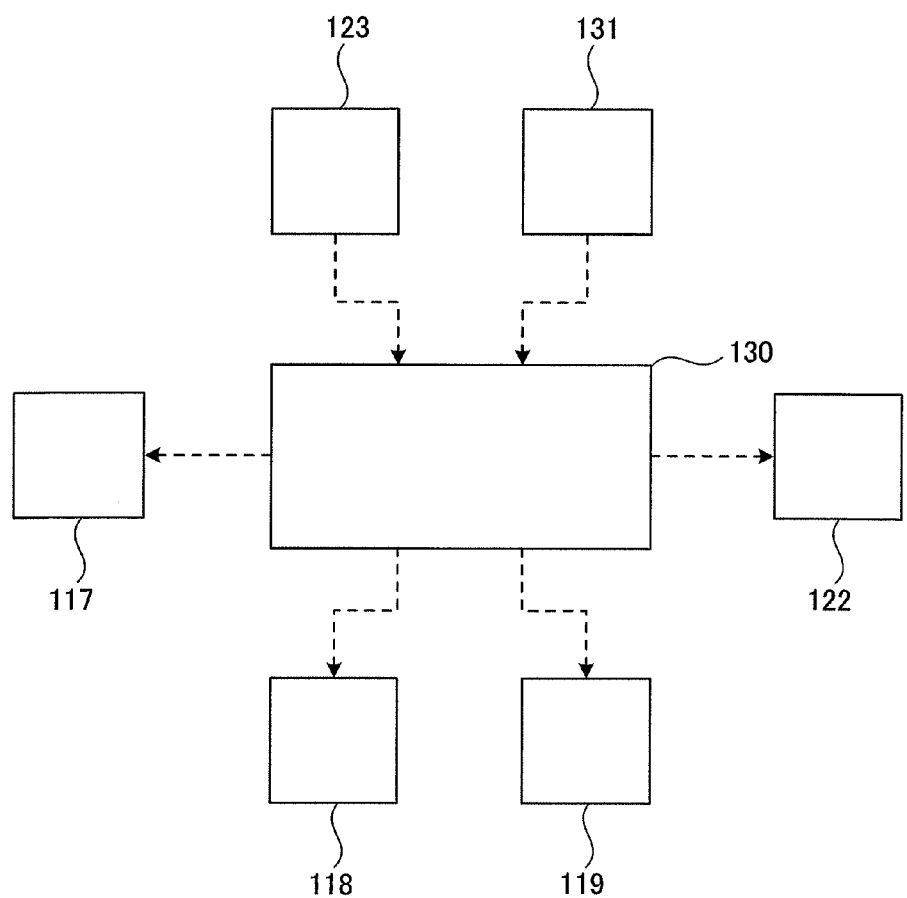
FIG. 3 is a control block diagram of a main portion of the machine tool of FIG. 1.
Figure 4:
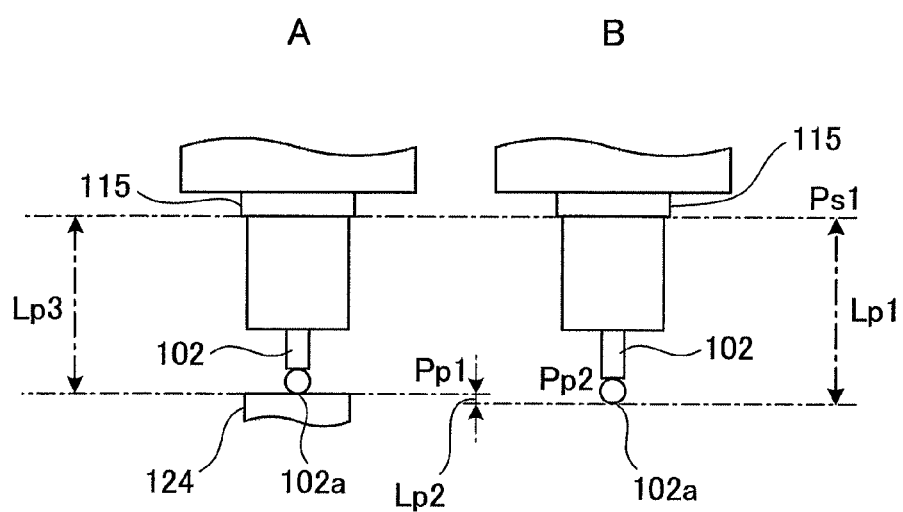
FIG. 4 shows views for illustrating how to find an actual length of a touch probe.

Moreover, as shown in FIG. 3, the CCD camera 123 of the attachment measuring device 120 is electrically connected to an input unit of a control device 130, which is control means. An input device 131, which is input means for inputting various data to the control device 130, is further electrically connected to the input unit of the control device 130. The automatic tool changer 117 various drive motors 118, a drive motor 119, and the light source 122 are electrically connected to an output unit of the control device 130. The drive motors 118 move the saddle 113, the main spindle head 114 and the table 116, respectively, in order to move the main spindle 115 in the X-axis direction, the Y-axis direction, and the Z-axis direction. The drive motor 119 rotates the main spindle 115. The control device 130 is configured to control the operations of the automatic tool changer 117, the drive motors 118, 119, the light source 122, and the like on the basis of information inputted from the input device 131, information taken as images by the CCD camera 123, and the like (details are described later).

Next, a machining method is described in which the machine tool 100 according to this embodiment is used.

First, a preliminary setting step described below is conducted before the machine tool 100 is operated.

First, the touch probe 102 is attached to the spindle end of the main spindle 115, and the holding block 124 is placed in the recessed portion 121a of the supporting block 121 of the attachment measuring device 120. Then, when the control device 130 is activated, the control device 130 activates the motors 118 to move the saddle 113, the main spindle head 114, the table 116, and the like, so that the touch probe 102 takes the on state by causing the tip portion 102a of the touch probe 102 to come into contact with the upper surface of the holding block 124 of the attachment measuring device 120, as shown in FIG. 4A.

Subsequently, after detecting that the touch probe 102 is in the on state on the basis of information from the touch probe 102 the control device 130 records a position Ps1 of the spindle end of the main spindle 115 in the Z-axis direction (the vertical direction). Simultaneously, the control device 130 activates the light source 122 so that the light source 122 performs light irradiation. In addition, the control device 130 causes the CCD camera 123 to take as an image, and record a position Pp1 of the tip portion 102a of the touch probe 102 in the Z-axis direction (the vertical direction).

After the position Pp1 of the tip portion 102a of the touch probe 102 in the Z-axis direction (the vertical direction) is taken, as an image, and recorded by the CCD camera 123 as described above, the holding block 124 is detached from the supporting block 121 of the attachment measuring device 120. Here, the tip portion 102a of the touch probe 102 extends to its natural length and the touch probe 102 takes an off state as shown in FIG. 4B. The control device 130 detects that the touch probe 102 is now in the off state on the basis of information from the touch probe 102. Then the control device 130 activates the light source 122 so that the light source 122 performs light irradiation, and causes the CCD camera 123 to take, as an image, and record a position Pp2 of the tip portion 102a of the touch probe 102 in the Z-axis direction (the vertical direction).

Next, the control device 130 calculates a dead zone length Lp2 (=Pp2−Pp1) of the touch probe 102 from the difference between the position Pp1 of the tip portion 102a of the touch probe 102 in the Z-axis direction (the vertical direction) in the on state and the position Pp2 of the tip portion 102a in the Z-axis direction (the vertical direction) in the off state, and stores the dead zone length Lp2.

Then, the touch probe 102 is detached from the spindle end of the main spindle 105 to complete the preliminary setting step (end of a touch probe dead zone length calculation step).

When the machine tool 100 is operated to actually machine the workpiece 1 after completion of the preliminary setting step as described above, the following steps are carried out.

First, the workpiece 1 is mounted on the table 116 and fixed and supported thereon, and various conditions such as conditions of the workpiece 1 and machining conditions are inputted to the input device 131. Then, the control device 130 activates the motors 118 to move the saddle 113, the main spindle head 114, and the like, and also activates the automatic tool changer 117, so that the touch probe 102 is selected from the attachments 101 stored in the magazine of the automatic tool changer 117, and attached to the spindle end of the main spindle 115.

Next, the control device 130 locates the main spindle 115 at a prescribed position Ps1 above the supporting block 121 of the attachment measuring device 120, and activates the motors 118 to move the saddle 113, the main spindle head 114, the table 116, and the like, so that the tip portion 102a of the touch probe 102 is positioned in the recessed portion 121a of the supporting block 121.

Subsequently, the control device 130 activates the light source 122 so that light source 122 performs light irradiation, and causes the CCD camera 123 to take, as an image, and record a position Pp2 of the tip portion 102a of the touch probe 102 in the Z-axis direction (the vertical direction). Thus, an apparent length Lp1 (=Pp2−Ps1) of the touch probe 102 in the Z-axis direction (the vertical direction) is found.

Then, the control device 130 finds a substantive length Lp3 (=Lp1−Lp2) of the touch probe 102 in an actual machining environment on the basis of the newly found length Lp1 of the touch probe 102 by taking the dead zone length Lp2 stored in the preliminary setting step into consideration (end of a touch probe length calculation step).

After the substantive length Lp3 of the touch probe 102 is thus found, the control device 130 activates the motors 118 to move the saddle 113, the main spindle head 114, the table 116, and the like, so that the touch probe 102 takes the on state by causing the tip portion 102a of the touch probe 102 to come into contact with the upper surface of the workpiece 1 on the table 116.

Figure 5:
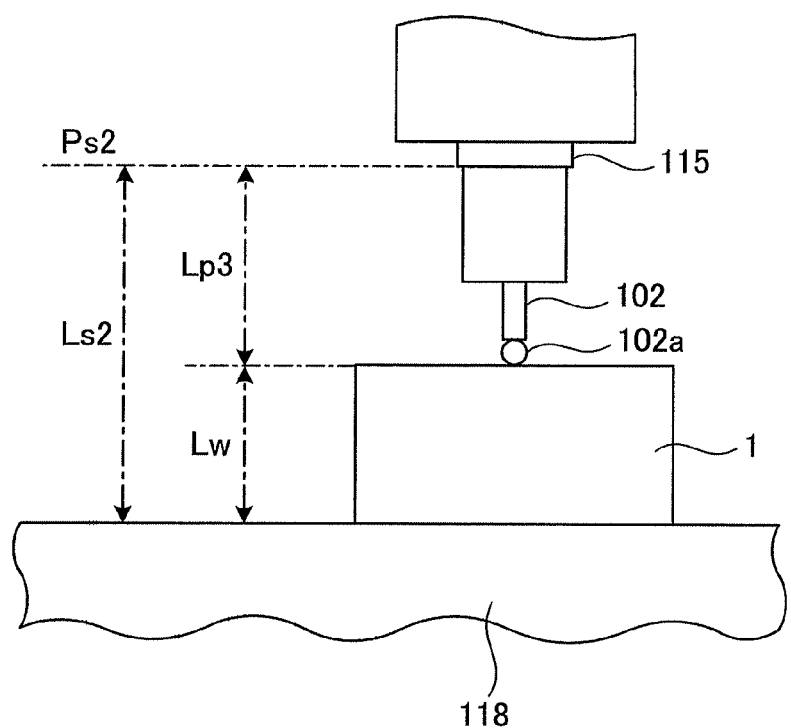
FIG. 5 is a view for illustrating how to find an actual height position (a length in the vertical direction) of a workpiece.

After detecting that the touch probe 102 is in the on state on the basis of information from the touch probe 102, the control device 130 finds an actual height (a length in the vertical direction) Lw (=Ls2−Lp3) of the workpiece 1 from a position Ps2 of the spindle end of the main spindle 115 in the Z-axis direction (the vertical direction) at that time, i.e., the length Ls2 between the spindle end of the main spindle 115 and the upper surface of the table 116, and also from the substantive length Lp3 of the touch probe 102 as shown in FIG. 5 (end of a workpiece height calculation step).

After the actual height (the length in the vertical direction) Lw of the workpiece 1 is found as described above, the control device 130 activates the motors 118 to move the saddle 113, the main spindle head 114, and the like, and also activates the automatic tool changer 117, so that the touch probe 102 on the main spindle 115 is replaced with a tool 103 selected from the attachments 101 stored in the magazine of the automatic tool changer 117.

Figure 6:
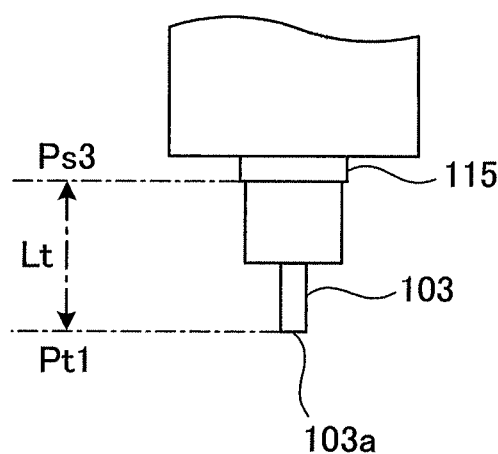
FIG. 6 is a view for illustrating how to find an actual length of a tool.

Subsequently, as shown in FIG. 6, the control device 130 activates the motors 118 to move the saddle 113, the main spindle head 114, the table 116, and the like, so that the spindle end of the main spindle 115 is located at a predetermined position Ps3, and a tip portion 103a of the tool 103 is located in the recessed portion 121a of the supporting block 121 of the attachment measuring device 120. Then, the control device 130 activates the light source 122 so that the light source 122 performs light irradiation, and causes the CCD camera 123 to take, as an image, and find a position Pt1 of the tip portion 103a of the tool 103 in the Z-axis direction (the vertical direction).

Then, the control device 130 calculates an actual length Lt (=Pt1−Ps3) of the tool 103 from the position Ps3 of the spindle end of the main spindle 115 in the Z-axis direction (the vertical direction) and the position Pt1 of the tip portion 103a of the tool 103 in the Z-axis direction (the vertical direction) (end of a tool length calculation step).

After the actual height (the length in the vertical direction) Lw of the workpiece 1 and the actual length Lt of the tool 103 are thus found, the control device 130 activates the motors 118, 119 to rotate the main spindle 115 and move the saddle 113, the main spindle head 114, the table 116, and the like, so that the workpiece 1 is machined while the workpiece 1 and the tool 103 are moved relative to each other, on the basis of various conditions inputted from the input device 131, the actual height (the length in the vertical direction) Lw of the workpiece 1, and the actual length Lt of the tool 103 (end of a main machining step).

In other words in this embodiment, the dead zone length Lp2 of the touch probe 102 is calculated in such a manner that the position Pp1 of the tip portion 102a of the touch probe 102 in the on state and the position Pp2 of the tip portion 102a in the off state are optically measured by taking images with the CCD camera 123. Then, the substantive length Lp3 of the touch probe 102 is found from its apparent length Lp1. In addition, the length Lt of the tool 103 is found in such a manner that the position Pt1 of the tip portion 103a of the tool 103 is optically measured by taking an image with the CCD camera 123.

For this reason, this embodiment makes it possible to eliminate measurement errors associated with change in temperature, and also eliminate measurement errors due to the dead zone length Lp2 of the touch probe 102.

Accordingly, this embodiment makes it possible to easily machine the workpiece 1 with higher precision than conventional methods.

<Other Embodiments>

Note that, in the embodiment described above, a case is described where the attachment measuring device 120 is used which optically measures the positions of the tip portion 102a of the touch probe 102 and the tip portion 103a of the tool 103 by taking images using the light source 122 and the CCD camera 123. However, as another embodiment, for example, it is also possible to employ attachment measurement means for optically measuring the positions of the tip portion 102a of the touch probe 102 and the tip portion 103a of the tool 103 in such a manner that a laser beam is emitted from a laser beam emitting deceive to the tip portion 102a of the touch probe 102 or the tip portion 103a of the tool 103, and the laser beam is received with a laser beam receiving deceive, while the laser beam is being scanned.

INDUSTRIAL APPLICABILITY

The machining method according to the present invention makes it possible to easily machine a workpiece with higher precision than conventional methods. Hence, the machining method according to the present invention can be used with great usefulness in various industries including metal machining industries and the like.

REFERENCE SIGNS LIST

1 Workpiece
100 Machine Tool
101 Attachment
102 Touch Probe
102a Tip Portion
103 Tool
103a Tip Portion
111 Bed
112 Column
113 Saddle
114 Main Spindle Head
115 Main Spindle
116 Table
117 Automatic Tool Changer
118, 119 Drive Motor
120 Attachment Measuring Device
121 Supporting Block
121 Recessed Portion
122 Light Source
123 CCD Camera
124 Holding Block
130 Control Device
131 Input Device

The invention claimed is:

1. A machining method using a machine tool configured to machine a workpiece by moving a tool attachably and detachably attached to a main spindle and the workpiece fixed and supported on a table relative to each other, the method comprising:

a touch probe dead zone length calculation step of attaching a touch probe to the main spindle, optically measuring each of a position Pp1 of a tip portion of the touch probe in an on state and a position Pp2 of the tip portion of the touch probe in an off state at a time when a spindle end of the main spindle is located at a prescribed position Ps1, and calculating a dead zone length Lp2 of the touch probe on the basis of the positions Pp1, Pp2;

a touch probe length calculation step of calculating an apparent length Lp1 of the touch probe on the basis of the position Ps1 of the spindle end of the main spindle and the position Pp2 of the tip portion of the touch probe in the off state, and calculating a substantive length Lp3 of the touch probe on the basis of the apparent length Lp1 with the dead zone length Lp2 taken into consideration;

a workpiece height calculation step of finding an actual height Lw of the workpiece on the basis of the substantive length Lp3 of the touch probe and a position Ps2 of the spindle end of the main spindle at a time when the tip portion of the touch probe attached to the main spindle is brought into contact with an upper surface of the workpiece on the table to cause the touch probe to take an on state;

a tool length calculation step of attaching the tool to the main spindle, optically measuring a position Pt1 of a tip portion of the tool at a time when the spindle end of the main spindle is located at a prescribed position Ps3, and calculating an actual length Lt of the tool on the basis of the position Ps3 of the spindle end of the main spindle and the position Pt1 of the tip portion of the tool; and a main machining step of machining the workpiece by moving the workpiece and the tool relative to each other on the basis of the actual height Lw of the workpiece calculated in the workpiece height calculation step and the actual length Lt of the tool calculated in the tool length calculation step.

* * * * *